Figure 1:
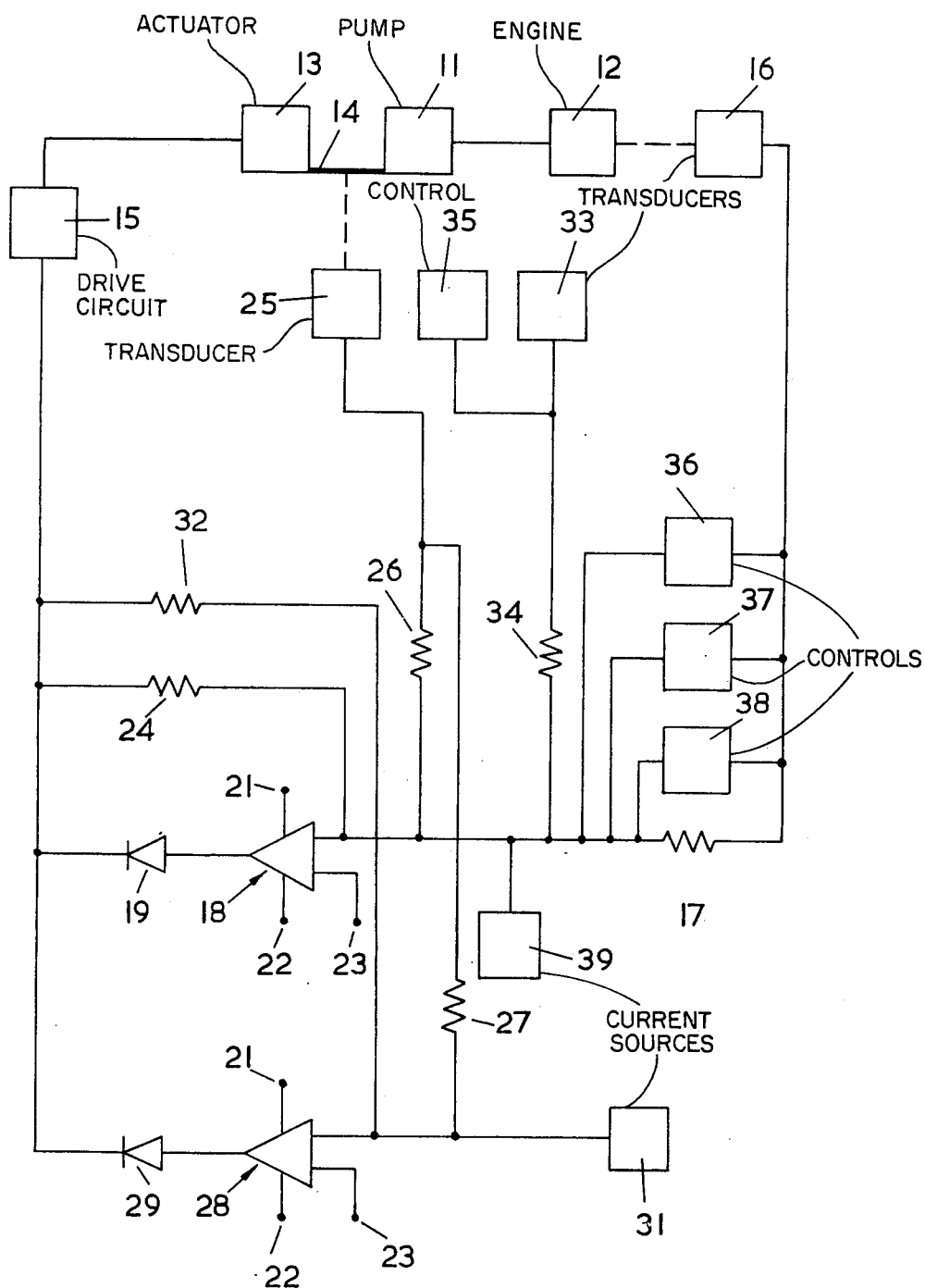

United States Patent [19]
Williams et al.

[11] 3,973,538
[45] Aug. 10, 1976

[54] FUEL SYSTEMS FOR ENGINES

[75] Inventors: Malcolm Williams, Solihull; Christopher Robin Jones, Alcester; Richard William Crookes, Solihull, all of England

[73] Assignee: C.A.V. Limited, Birmingham, England

[22] Filed: Feb. 11, 1975

[21] Appl. No.: 549,057

Related U.S. Application Data
[63] Continuation of Ser. No. 429,366, Dec. 28, 1973, abandoned.

[30] Foreign Application Priority Data
Jan. 6, 1973  United Kingdom.............. 891/73

[52] U.S. Cl............................ 123/139 E; 290/40 F; 123/140 MC
[51] Int. Cl.².................. F02M 39/00; F02D 1/04
[58] Field of Search............ 123/139 E, 32 EA, 102, 123/140 MC; 290/40

[56] References Cited
UNITED STATES PATENTS

| | | | |
|---|---|---|---|
| 3,407,793 | 10/1968 | Lang | 123/139 E |
| 3,425,401 | 2/1969 | Lang | 123/139 E |
| 3,699,935 | 10/1972 | Adler | 123/139 E |
| 3,707,950 | 1/1973 | Schlimme | 123/139 E |
| 3,757,750 | 9/1973 | Ohtani | 123/139 E |
| 3,777,174 | 12/1973 | Butscher | 123/139 E |
| 3,815,564 | 6/1974 | Suda | 123/139 E |
| 3,822,679 | 7/1974 | Hobo | 123/139 E |
| 3,889,648 | 6/1975 | Williams | 123/139 E |

Primary Examiner—Charles J. Myhre
Assistant Examiner—Ronald B. Cox
Attorney, Agent, or Firm—Holman & Stern

[57] ABSTRACT

A fuel system for an engine has a pump which supplies fuel to the engine and an actuator for controlling the pump output. The actuator is controlled by a control circuit to which are fed electrical signals representing demanded engine speed, actual engine speed and pump output. The control circuit sets the slope of the pump output versus speed curves of the engine, and speed-sensitive means operates below a predetermined engine speed for modifying this slope to make it shallower and so produce a smaller change in pump output for a given change in speed.

1 Claim, 3 Drawing Figures

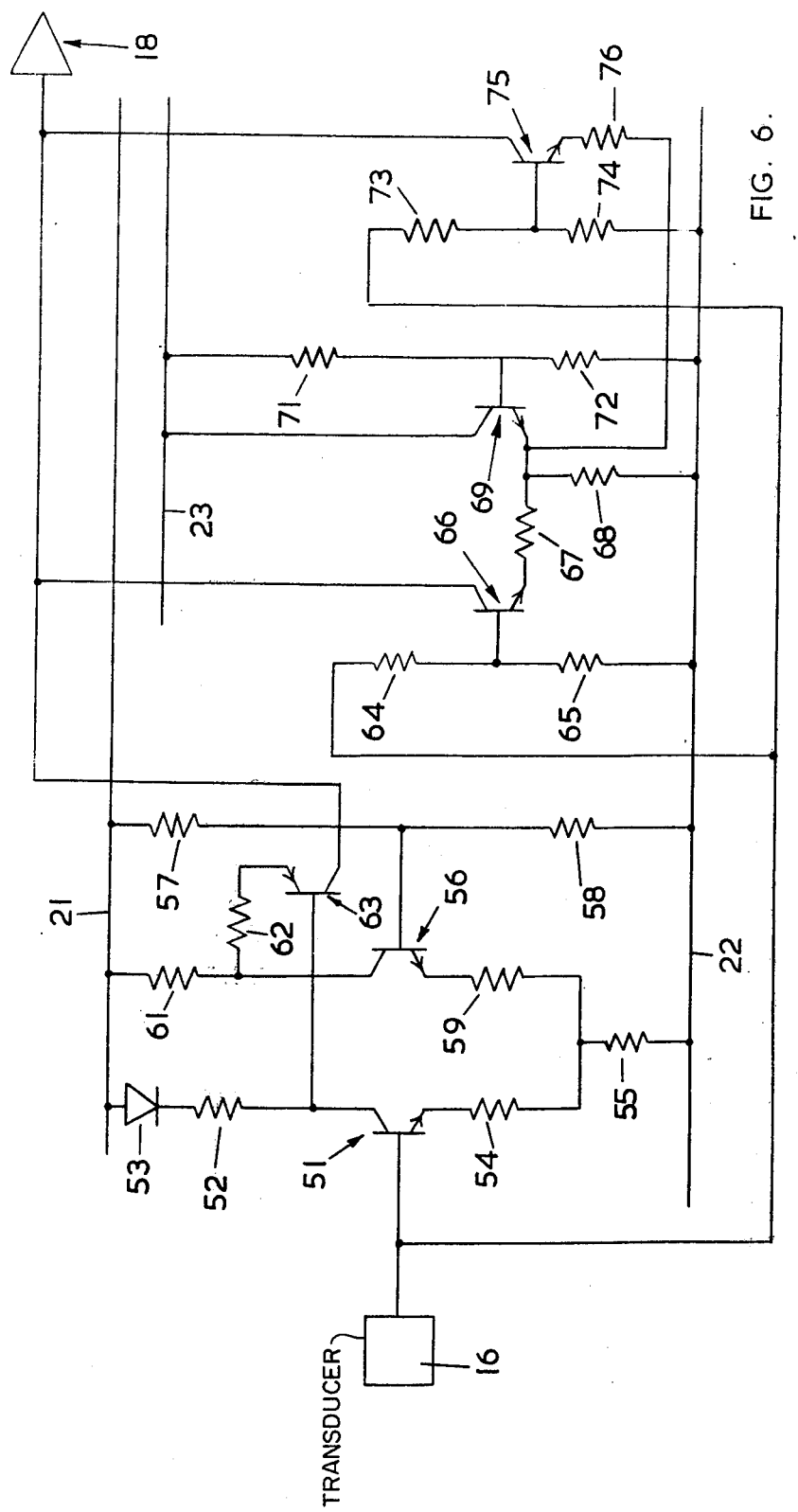

FUEL SYSTEMS FOR ENGINES

This is a continuation of application Ser. No. 429,366 filed Dec. 28, 1973, now abandoned.

This invention relates to fuel systems for engines, particularly, but not exclusively, compression-ignition engines.

A fuel system according to the invention comprises in combination a pump supplying fuel to the engine, an actuator controlling the pump output, a control circuit to which are fed electrical signals representing demanded engine speed, actual engine speed and pump output, said control circuit setting the slope of the pump output versus speed curves of the engine, and speed-sensitive means operating below a predetermined engine speed for modifying said slope to make it shallower and so produce a smaller change in pump output for a given change in speed.

Preferably, there is provided second speed-sensitive means operable below a second predetermined engine speed for making said slope still shallower.

Preferably, there is also provided further speed sensitive means operable at a low engine speed to make the slope steeper again.

Preferably, the or each speed-sensitive means comprises a long tailed transistor pair with one transistor having its base potential fixed and the other transistor having its base connected to a transducer producing a signal dependent on engine speed.

In one preferred arrangement, the invention resides in a fuel injection system for a diesel engine, comprising in combination a pump for supplying fuel to the engine, an electro-mechanical actuator coupled to the pump to determine the pump output, a drive circuit for controlling the electro-mechanical actuator, first second and third transducers producing respectively output voltages representing engine speed, pump output and demanded engine speed, a first operational amplifier connected as a summing amplifier and having its inverting input connected through resistors to the first second and third transducers, said first amplifier producing an output representing the difference between the actual and demanded engine speeds, but the difference being modified in accordance with the input received from the second transducer so as to provide the required engine characteristics, a second operational amplifier connected as a summing amplifier and having its inverting input connected through a resistor to the second transducer, and a discriminator coupling the output of the amplifiers to the drive circuit, the arrangement being such that until a predetermined pump output is attained, the discriminator couples the first amplifier to the drive circuit, but when said predetermined rate of supply of fuel is reached, the discriminator couples the second amplifier to the drive circuit to limit the maximum rate of supply of fuel, the system further including first speed-sensitive means operable when the engine speed is below a first value to provide an input to the inverting input of the first operational amplifier so as to modify the engine characteristics, and second speed-sensitive means operable when the engine speed is below a second and lower predetermined value to provide a further input to the inverting input of the first operational amplifier, so as to further modify the engine characteristics.

Figure 2:
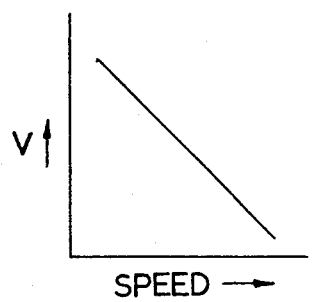
Figure 3:
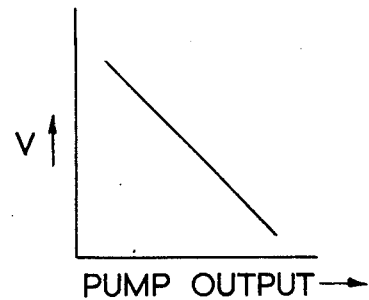
Figure 4:
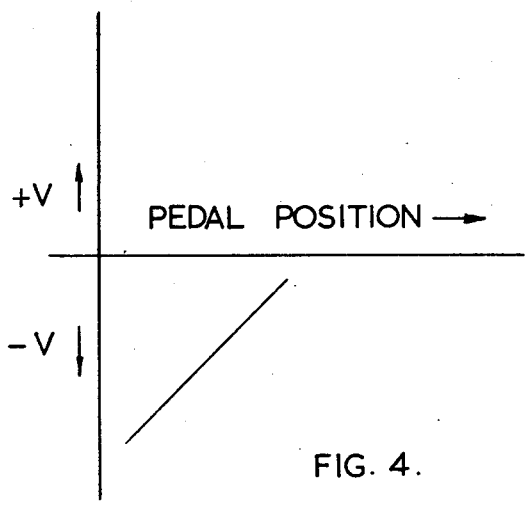
Figure 5:
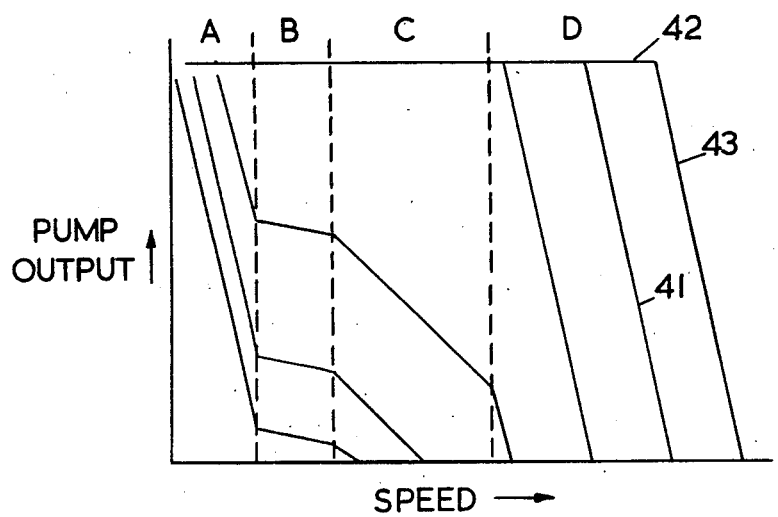

An example of the invention, as applied to a diesel engine driving a road vehicle, is illustrated in the accompanying drawings, in which FIG. 1 is a circuit diagram, partly in block form, FIGS. 2 to 4 respectively have graphs illustrating the outputs of three transducers used in FIG. 1, FIG. 5 shows the pump output versus speed characteristics of an engine controlled using the arrangement shown in FIG. 1, and FIG. 6 is a circuit diagram illustrating the preferred forms of three controls used in FIG. 1.

Referring first to FIG. 1, there is provided a pump 11 which supplies fuel to an engine 12. The rate at which the pump supplies fuel is determined by the position of a control rod 14 forming part of the pump 11, and the control rod 14 is moved against the action of a spring by an electro-mechanical actuator 13. The spring urges the control rod 14 to a minimum output position.

The actuator 13 is itself controlled by a drive circuit 15, and the speed of the engine 12 is sensed by a transducer 16 which produces an output voltage of the form shown in FIG. 2. The output from the transducer 16 is fed by way of a resistor 17 to the inverting input terminal of an operational amplifier 18 which is connected between a pair of supply lines 21, 22, and has its non-inverting input terminal connected to a supply line 23. The supply line 21 is positive with respect of the supply line 22, and the supply line 23 is at a potential mid-way between the potentials of the lines 21, 22. The origin in FIGS. 2 to 4 represents the potential of the line 23.

The output terminal of the amplifier 18 is connected through a diode 19 to the drive circuit 15, and the amplifier 18 is connected as a summing amplifier and for this purpose has a feed-back resistor 24 from the input to the drive circuit 15 to its inverting input terminal.

The position of the control at 14 is sensed by a transducer 25 which produces an output of the form shown in FIG. 3. The output from the transducer 25 is fed through a resistor 26 to the inverting input terminal of the amplifier 18, and is further fed through a resistor 27 to the inverting input terminal of a further operational amplifier 28. The operational amplifier 28 has the same power supplies as the amplifier 18, and has its output terminal connected through a diode 29 to the drive circuit 15, and a feed-back resistor 32 from the input of the drive circuit 15 to its inverting input terminal. A current source 31 provides a further input to the amplifier 28, and moreover there is provided a transducer 33 which produces an output representing demanded engine speed, this output being of the form shown in FIG. 4. The output from the transducer 33 is fed through a resistor 34 to the inverting input terminal of the amplifier 18, and a control 35 is associated with the transducer 33, the control 35 serving to limit the maximum demand, and thereby to limit the maximum engine speed. Finally, the transducer 16 provides inputs to three controls 36, 37, 38 each of which produces an output which is fed to the inverting input terminal of the amplifier 18, for a reason to be explained, and a current source 39 provides an input to the amplifier 18 to set the engine idling speed.

In order to understand the operation of FIG. 1, it should first be noted that at any given moment only one of the amplifiers 18, 28 can provide an input to the drive circuit 15. Thus, if the amplifier 18 is producing a greater positive output than the amplifier 28, then the diode 29 will be reverse biased, and if the amplifier 28 is producing a greater positive output, then the diode 19 is reverse biased. It should further be noted that an increasing positive output from an amplifier 18, 28 represents a demand for a decreasing rate of supply of fuel. Thus, at any given instant, the amplifier 18 or 28 which demands the smaller pump output controls the drive circuit 15.

Referring now to FIG. 5, the operational characteristic of the engine has been divided into four regions, A, B, C and D. In region D, none of the controls 36, 37 and 38 is effective. In region C, the control 36 is operating. In region B the control 36 and the control 37 are operating, and finally in region A all three controls that is 36, 37, 38 are operating. It is convenient to consider first operation in the region D. The inclined lines represent operating curves for different demands. By way of example, suppose the accelerator pedal of the vehicle driven by the engine is set to demand 80% of full speed, then the operating point of the engine will lie somewhere on the line 41 shown in FIG. 5. With the demand set at this value, then the amplifier 18 receives input currents representing the actual engine speed and the demanded engine speed, and as can be seen from FIGS. 2 to 4, these currents flow in opposite directions. The amplifier 18 compares these two currents, and also the current it receives from the transducer 25, and then produces an output which serves through the drive circuit 15 and the actuator 13 to modify the pump output until the net current flowing to the amplifier 18 is substantially zero. It will be appreciated that the slope of the curve 41 is a result of the input current through the resistor 26, and in fact the slope is set by the relative values of the resistor 17, 26. As long as the demand is kept constant, the amplifier 18 will operate to keep the engine working on the curve 41, the position on the curve 41 being determined by the load on the engine.

If demand is increased, for example to maximum demand, then the pump output increases as fast as the pump and governor will permit until the line 42 is reached. When the line 42 is reached, the amplifier 28 produces a greater output than the amplifier 18, and limits the pump output. The line 42 is set by the current source 31. When the pump output reaches the line 42, the engine speed will increase along the line 42, and the pump output will then decrease along the maximum speed line 43, which is set by the control 35. The engine will end at a point on the line 43 determined by load.

If the demand is reduced, then the pump output falls to zero, and the engine speed decreases until the new demand line is reached, after which the pump output increases again in a manner determined by the shape of the new demand line, and the engine ends at a point on the new demand line determined by load.

The way in which the engine operates in the other three regions A, B and C does not differ in any way, but the shapes of the characteristics within these regions are different. Thus, when the engine speed falls below the speed indicated by the dotted lines separating regions C and D, then the curves immediately become shallower. This is because below the first predetermined speed, the control 36 draws current from the inverting input terminal of the amplifier 18. When the speed indicated by the junctions of regions B and C is reached, the control 37 operates and increases the amount of current drawn from the amplifier 18. However, when the speed indicated by the junctions between the regions A and B is reached, then the control 38 operates and increases the current flowing to the inverting input terminal of the amplifier 18, so that the slope becomes steeper again. The regions C and D are the normal operating regions of the engine, and the regions A and B are the idling regions. The normal idling curve is that shown in region B, and the reason for increasing the slope of this curve in the region A is that under zero demand conditions, then if the curve shown in Region B were to continue without changing its slope in the region A, there would be a large speed change if a load were to be imposed on the engine. Such a load could for example be the result of an automatic transmission on a vehicle. By making the curves steeper in the region A, the change in speed for a given load is considerably reduced.

The preferred arrangement of the controls 36 to 38 is shown in FIG. 6. Referring to FIG. 6, the transducer 16 is coupled to the base of an n-p-n transistor 51, the collector of which is connected to the line 21 through a resistor 52 and a diode 53 in series. The emitter of the transistor 51 is connected to the line 22 through resistors 54, 55 in series, and a further n-p-n transistor 56 is provided having its base connected to the junction of a pair of resistors 57, 58 connected in series between the lines 21, 22. The collector of the transistor 56 is connected to the line 21 through a resistor 61, and its emitter is connected to the line 22 through a resistor 59 in series with the resistor 55. The collector of the transistor 51 is connected to the base of a p-n-p transistor 63, and the collector of the transistor 56 is connected to the emitter of the transistor 63 through a resistor 62. The collector of the transistor 63 provides an input to the amplifier 18.

The transducer 16 is further connected to the line 22 through resistor 64, 65 in series, the junction of the resistor 64, 65 being taken to the base of an n-p-n transistor 66, the emitter of which is connected to the line 22 through resistors 67, 68 in series. A further n-p-n transistor 69 is provided having its base connected to the junction of a pair of resistors 71, 72 connected in series between the lines 23, 22. The collector of the transistor 69 is connected to the line 23, and its emitter is connected to the line 22 through the resistor 68.

The transducer 16 is further connected to the line 22 through a pair of resistors 73, 74. The junction of the resistor 73, 74 is connected to the base of an n-p-n transistor 75, and the emitter of the transistor 75 is connected to the line 22 through a resistor 76 and the resistor 68 in series. The collector of the transistor 75, and the collector of the transistor 66, are connected to the inverting input terminal of the amplifier 18.

In the region D, none of the transistors 75, 66, 63 conducts. As the engine speed falls, the potentials on the bases of the transistors 75 and 66 increase, until when the region C is reached, the transistor 75 turns on. The exact operating point is set using the resistor 73, and once the transistor 75 is on, the input current it provides to the amplifier 18, that is to say the slope within the region C, is determined by the resistor 76.

When the region B is reached, the transistor 66 also conducts. The operating point of the transistor 66 is set by the resistor 64, and the change in slope in the region B is determined by the resistor 67.

It will be appreciated that the transistor 69 effectively forms a long tailed pair with each of the transistors 66 and 75, and compensates for drift in the base-emitter voltages of both transistors 66 and 75.

The control 38, which is constituted by the transistors 51, 56 and 63, is slightly more complicated because it is necessary to invert the signal as compared with the controls 36 and 37. At high engine speeds, the transistor 51 is off altogether and the transistor 56 is on, but as the engine speed reduces, the transistors 51, 56 in the long-tailed pair share the current until when the region A is reached, the transistors 51 and 56 are conducting equally, so that the transistor 63 is about to conduct. Any further decrease in speed now causes the transistor 51 to conduct more than the transistor 56, so that the transistor 63 comes on to provide a signal to the amplifier 18. As with the other two controls 36, 37, care is taken that the operating point does not drift, and it will be noted in particular that the diode 53 compensates for the base-emitter diode of the transistor 63.

We claim:

1. A fuel injection system for a diesel engine, comprising in combination a pump for supplying fuel to the engine, an electro-mechanical actuator coupled to the pump to determine the pump output, a drive circuit for controlling the electro-mechanical actuator, first, second and third transducers producing respectively output voltages representing engine speed, pump output and demanded engine speed, a first operational amplifier connected as a summing amplifier and having its inverting input connected through resistors to the first, second and third transducers, said first amplifier producing an output representing the difference between the actual and demanded engine speeds, but the difference being modified in accordance with the input received from the second transducer so as to provide the required engine characteristics, a second operational amplifier connected as a summing amplifier and having its inverting input connected through a resistor to the second transducer, and a discriminator coupling the output of the amplifiers to the drive circuit, the arrangement being such that until a predetermined pump output is attained, the discriminator couples the first amplifier to the drive circuit, but when said predetermined rate of supply of fuel is reached, the discriminator couples the second amplifier to the drive circuit to limit the maximum rate of supply of fuel, the system further including first speed-sensitive means operable when the engine speed is below a first value to provide an input to the inverting input of the first operational amplifier so as to modify the engine characteristics, and second speed-sensitive means operable when the engine speed is below a second and lower predetermined value to provide a further input to the inverting input of the first operational amplifier, so as to further modify the engine characteristics.

* * * * *